Dec. 10, 1940.  E. W. KRUEGER  2,224,305
SHOCK ABSORBER
Filed March 29, 1939
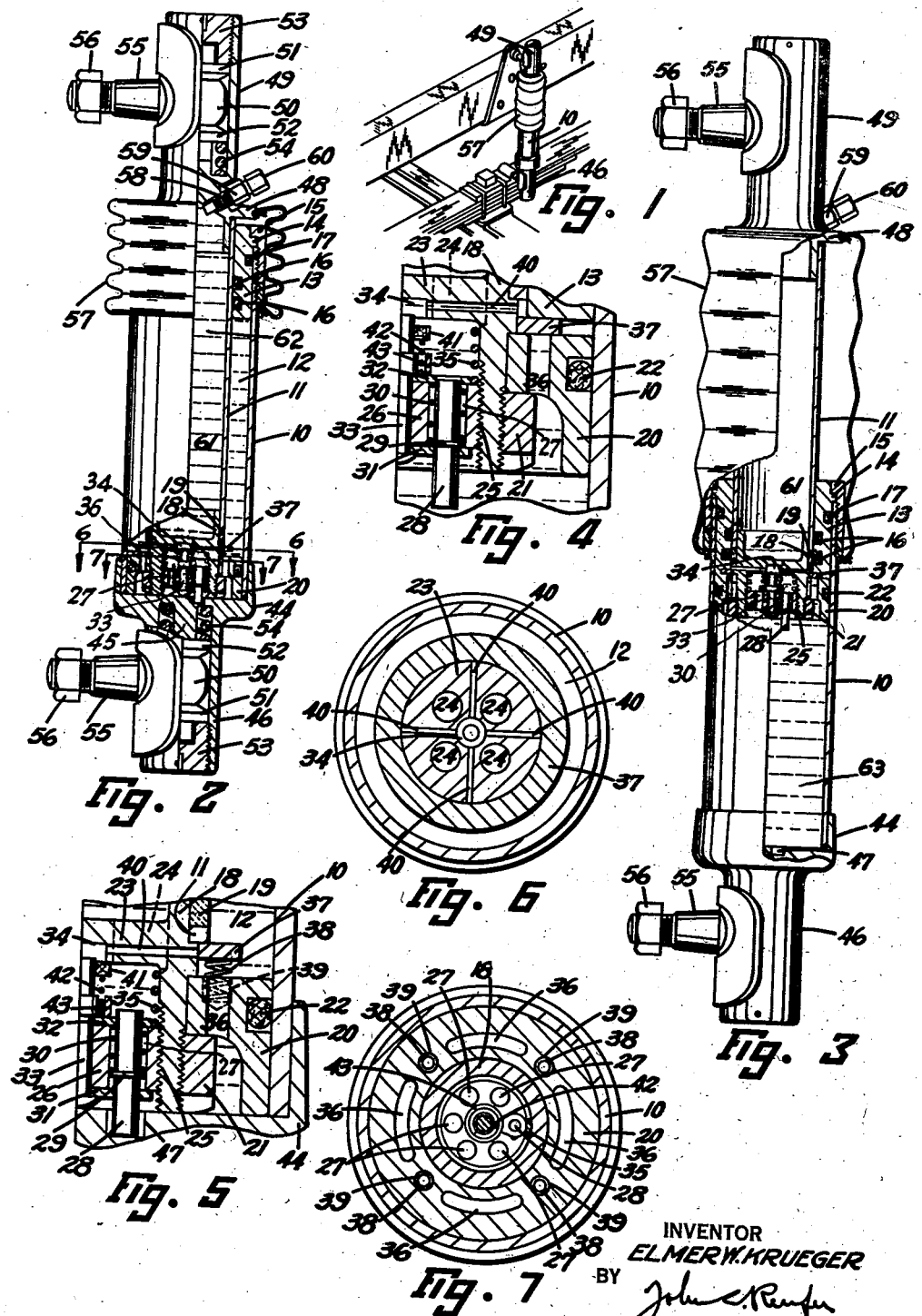
INVENTOR
ELMER W. KRUEGER
BY
ATTORNEY Patented Dec. 10, 1940

2,224,305

UNITED STATES PATENT OFFICE 2,224,305

SHOCK ABSORBER

Elmer W. Krueger, Cleveland, Ohio, assignor to The Cleveland Pneumatic Tool Company, Cleveland, Ohio, a corporation of Ohio Application March 29, 1939, Serial No. 264,817

8 Claims. (Cl. 188—88)

This invention relates broadly to a shock absorbing device useful in the arts in general, and more particularly for use on vehicles such as automobiles or the like to prevent excessive movement of the vehicle body relative to its axles.

One object of this invention is to produce an improved shock absorber of the direct acting hydraulic type including a pair of telescoping cylinders provided with valve controlled passages enabling freer telescopic movement of the cylinders in one direction than in the other, thereby making the device particularly useful as a recoil checking mechanism.

Another object of this invention is to produce such a shock absorber with adjustable means for varying the degree of freedom of the recoil movement of the cylinders, the means being readily adjustable from the exterior of the shock absorber before installation, thus rendering the shock absorber applicable to all kinds of vehicles irrespective of the load carrying capacity thereof.

Other objects and advantages more or less ancillary to the foregoing reside in the specific construction and aggroupment of the elements peculiar to this structure, as will become apparent from a more complete examination of this specification.

In the drawing:

Fig. 1 represents a perspective view of the shock absorber connected to parts of a vehicle whose relative movements are to be cushioned.

Fig. 2 is a side elevational view partly in section of the shock absorber shown in a fully compressed position.

Fig. 3 is a view similar to Fig. 2 illustrating the shock absorber in a fully extended position.

Fig. 4 is an enlarged fragmentary sectional view of the shock absorber as shown in Fig. 3.

Fig. 5 is a view similar to Fig. 4 of the shock absorber in the position shown in Fig. 2.

Fig. 6 is an enlarged sectional view taken in a plane indicated by line 6—6 in Fig. 2.

Fig. 7 is an enlarged sectional view taken in a plane indicated by line 7—7 in Fig. 2.

Referring to the drawing; the shock absorber includes two telescoping cylinders 10 and 11, the former being the outer cylinder laterally spaced from the inner cylinder to form therebetween an annular chamber 12 closed at its upper end by a head 13 formed with an external annular flange 14 resting on the upper end of the outer cylinder 10 and clamped thereon by a cap 15 threaded on the cylinder 10. The head 13 carries two longitudinally spaced internal packing rings 16 and a similar external ring 17 affording a fluid tight joint between the head and the two cylinders, while the head 13 is internally machined to fit closely on the cylinder 11 and act as a sliding bearing between the two cylinders.

The lower or outer end or the inner cylinder 11 carries an insert 18 preferably welded in position as at 19, which insert extends beyond the extreme end of the cylinder and has mounted thereon a piston 20 secured in position by a nut 21, and is closely fitted for slidable engagement with the inner wall of the cylinder 10 to act as a sliding bearing between the two cylinders. This piston also carries a packing ring 22 in fluid tight engagement with the inner wall of the cylinder 10. Between its ends, the insert 18 is provided with a partition 23 having a plurality of relatively large ports 24 extending longitudinally therethrough. The interiors of the two cylinders form a liquid reservoir or chamber generally designated by 61, which reservoir extends from the closed upper end of the inner cylinder 11 to the closed lower end of the outer cylinder 10, and is actually divided by the ported partition 23 to form a reservoir upper portion 62 extending from the partition 23 to the closed upper end of the inner cylinder 11, and a reservoir lower portion 63 extending from the piston 20 or its partition 23 to the closed lower end of the outer cylinder 10. The ports 24, extending through the partition 23, afford free communication between the upper portion 62 of the reservoir 61 and the lower portion 63 thereof. Below this partition the insert is internally threaded as at 25 to receive a plug 26 provided with a plurality of equally spaced ports 27 longitudinally extended therethrough. Within one of these ports there is slidably mounted an adjusting pin 28 formed intermediate its ends with a collar 29 on which is seated a compression spring 30 constantly urging the pin 28 downwardly. This pin is retained in the plug 26 by two retaining washers 31 and 32, the former engageable by the collar 29 of the pin 28, and the latter by the compression spring 30. These two washers are secured one on each side of the plug 26 by a rivet 33 extending centrally through the plug and made to project upwardly therefrom partway into a counterbore 34 provided within the partition 23. The plug 26 is normally held against accidental rotation by the frictional engagement of a compression spring 35 interposed between the plug and the partition 23.

Extending longitudinally through the piston 20, there is a plurality of semicircular slots or passages 36 capable of being closed by a plate valve 37 slidably mounted between the end of the tube 11 and the adjacent end of the piston 20, and normally urged into engagement with the end of the tube 11 by a plurality of compression springs 38 located within blind holes 39 formed in the piston 20 between the slots 36. As shown in Fig. 5, the plate valve 37 is made to close the ends of four radially disposed ports 40 extending from the annular chamber 12 through the partition 23 into the counterbore 34, which passages are located between the ports 24 as clearly shown in Fig. 6. Communication of the counterbore 34 with the plug 26 is controlled by a ring valve 41 slidable on the rivet 33 and constantly urged into engagement with the partition 23 by a compression spring 42, which spring is interposed between the valve 41 and the plug 26. To prevent lateral distortion of the spring 42, there is provided a short annular sleeve 43 resting on the washer 32.

The lower or outer end of the outer cylinder 10 has rigidly secured thereon a cup-shaped terminal 44 formed with a bottom wall 45 and a hollow stem 46. Within the wall 45 there is provided a blind hole 47 adapted to receive the lower end portion of the pin 28 slidable within the plug 26 for the purpose which will be explained later. The upper end of the inner cylinder 11 is also closed by a terminal 48 rigidly secured thereto by any suitable means and having a hollow stem 49 similar to the stem 46 of the terminal 44. Mounted within each stem of the terminals 44 and 48, there is a ball and socket joint including a ball 50 and the two sockets 51 and 52, the former resting on a plug 53, while the latter is urged toward the ball 50 by a compression spring 54. The ball 50 is formed with an integral shank 55 extending radially through the terminal, which shank carries a nut 56. Secured to the terminal 48 and to the upper end portion of the outer cylinder 10, there is a bellows boot or flexible circular casing 57 preventing admission of dust or other foreign matter on the inner cylinder when the shock absorber is in the extended position as shown in Fig. 3. Through the upper terminal 48, there is also provided a threaded bore 58 adapted to receive a filler plug 59 and an air valve 60.

In practice, the upper terminal 48 is preferably secured to the frame of the vehicle by the shank 55 and nut 56, while the lower terminal 44 is similarly affixed to the axle or spring of the vehicle as shown in Fig. 1. Before installation, however, the shock absorber is fully compressed as shown in Fig. 2 and liquid such as oil is poured into the reservoir 61 by removing the filler plug 59. During this process, the shock absorber is extended and again compressed several times to entirely bleed the air out of the chamber 12. When a sufficient amount of liquid is available, the shock absorber may first be filled when in fully extended position, as shown in Fig. 3, in which instance it is subsequently fully compressed with the oil plug 59 still removed, thereby causing the liquid from the lower portion 63 of the reservoir 61 to flow into the chamber 12 via the piston's passages 36, and the excessive amount of liquid in the upper portion 62 of the reservoir 61 to escape through the bore 58. When the liquid has filled the annular chamber 12 and the reservoir up to the level of the bore 58, the shock absorber is again fully extended as shown in Fig. 3, in which instance the level of the liquid is just above the partition 23 of the insert 18. Subsequently, the filler plug is again screwed in position causing the atmospheric air thus trapped into the reservoir 61 above the partition 23, or more particularly into the upper portion 62 of the reservoir 61, to act as a cushion interfering with the free compression strokes of the shock absorber. The distance between the shanks 55 of the ball and socket joints mounted within the terminals of the shock absorber, is calculated to cause partial compression of the shock absorber when finally installed as shown in Fig. 1. In other words, when the vehicle is at rest, the piston 20 will be positioned at substantially equal distance from the ends of its possible stroke within the cylinder 10.

During operation, forces tending to move the frame of the vehicle closer to the axle thereof, or in other words, tending to cause the compression of the shock absorber will effect displacement of the liquid within the reservoir 61 from the lower portion 63 to the upper portion 62 thereof through the ports 27 of the plug 26 and the ports 24 of the partition 23, and from the reservoir's lower portion 63 into the annular chamber 12 through the piston's passageways 36. In this instance, the displacement of the liquid and consequently the compression of the shock absorber is resisted only by the atmospheric air stored within the upper portion 62 of the reservoir 61, thus enabling a relatively free compression stroke of the shock absorber and permitting the leaf spring of the vehicle to absorb the load in the usual manner.

Subsequently, the energy stored within the leaf spring during its compression or deflection, will cause rebound or recoil movement of the vehicle frame relative to the axle, resulting in the expansion stroke of the shock absorber. In this instance, the compression springs 38 active on the valve 37 are calculated to hold the valve 37 open relative to the piston's passageways 36 during the return flow of the liquid from the chamber 12 into the reservoir 61 below the piston 20, or more particularly into the lower portion 63 of the reservoir 61, at a relatively slow rate of speed or low velocity. In other words, when the vehicle is subjected only to small shocks or vibrations resulting from its travel over smooth roads, the small upward displacement of the piston 20 relative to the cylinder 10 will not exert sufficient pressure on the liquid stored within the chamber 12 to close the valve 37, thereby enabling the valve to remain open and allowing an unrestricted flow of the liquid from the annular chamber 12 to the lower portion 63 of the reservoir 61. However, when the vehicle is subjected to more pronounced shocks, the rebound movements resulting therefrom will tend to cause the expansion of the shock absorber at a greater rate of speed, and consequently subject the liquid within the annular chamber 12 to a greater pressure corresponding to the rate of speed at which the piston 20 moves upwardly in the cylinder 10. In this instance, the increased pressure acting on the valve 37 will overcome the combined pressure of the compression springs 38 and shift the valve into engagement with the piston 20 for opening the outer ends of the ports 40 and closing the piston's passageways or slots 36. With the valve 37 in this position, the liquid from the annular chamber 12 will flow through the restricted ports 40 into the counterbore 34 to exert pressure on the ring valve 41. When the liquid pressure on the valve 41 is sufficient to partly overcome the pressure of the compression spring 42, the valve 41 will shift into more or less complete open position relative to the counterbore 34 and consequently to the restricted ports 40. Since the more or less complete opening of the valve 37 is responsive to pressure conditions of the liquid within the annular chamber 12, it will be understood that the valve 41 by controlling the liquid conveying capacity of the ports 40 also controls the degree of freedom at which the shock absorber may be expanded, which degree of freedom may be varied as hereinafter explained. With the valve 41 opened, the liquid from the counterbore 34 will flow through the plug's ports 27 into the lower portion 63 of the reservoir 61, while some of the liquid in the reservoir 61 will also flow from the upper portion 62 into the lower portion 63 thereof via the ports 24 and 27.

From the foregoing description, it will be clear that the expansion of the shock absorber under favorable road conditions is not affected by the displacement of the liquid in the shock absorber, thereby enabling the vehicle's springs to cushion relative movements of the vehicle frame and axle. Under more adverse road conditions, that is, when the frame has the tendency to rebound relative to the axle to an extent which would be uncomfortable to the passengers, the shock absorber will automatically check this rebound by restricting or retarding the flow of the liquid from the annular chamber 12 into the lower portion 63 of the reservoir 61. This checking of the liquid flow and consequently checking of the rebound is primarily controlled by the pressure of the compression spring 42 active on the ring valve 41, which pressure is adjustable as hereinafter explained. To that end, before installation of the shock absorber, the plug 26 on which is seated the compression spring 42 may be moved longitudinally into the insert 18 by the simple relative rotation of the cylinders 10 and 11. In this instance, the pin 28 located within the blind hole 47 provided within the terminal 44 of the cylinder 10, will upon rotation of that cylinder relative to the cylinder 11, rotate the plug 26 within the screw thread bore 25 of the insert 18, thereby increasing or decreasing the compression of the spring 42. For instance, when the shock absorber is to be installed to vehicles of heavy duty, the cylinders will be rotated relative to one another for decreasing the compression of the spring 42, thereby necessitating lower pressure of the liquid stored within the chamber 12 to shift the valve 41 into open position relative to the counterbore 34. Thus by varying the compression of the spring 42, it is possible to vary the liquid conveying capacity of the opening between the valve 41 and the partition 23 of the insert 18, which capacity can be controlled to regulate the riding qualities of the vehicle.

As previously stated, when the shock absorber is used as an auxiliary snubbing device between the vehicle spring and the frame, the compression of the shock absorber is restricted only by atmospheric air trapped in the upper portion 62 of the reservoir 61 during the rising of the liquid level within that portion of the reservoir. However when the shock absorber is to be used as an additional spring, compressed air may be admitted into the upper portion 62 of the reservoir 61 through the air valve 60 until the air within that portion of the reservoir has reached a predetermined pressure, which pressure will act as a resilient medium to cushion movement of the vehicle parts toward each other and will not affect the recoil checking function of the shock absorber in the manner above explained.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A hydraulic shock absorber comprising a pair of telescoping cylinders forming a liquid reservoir of varying volumetric capacity, liquid stored in said reservoir, an annular chamber between said cylinder closed at one end, a piston on the inner end of the inner cylinder forming the other end of said chamber, a passage through said piston enabling relatively free flow of the liquid between said reservoir and chamber during normal expansion and compression strokes of said cylinders, a restricted port leading from said chamber into said reservoir, a valve normally closing said port, said valve being responsive to a predetermined pressure within said chamber during the expansion strokes of said cylinders for closing said passage and opening said port, and a second valve responsive to pressure conditions within said chamber during the expansion strokes of said cylinders for controlling the liquid conveying capacity of said port.

2. A hydraulic shock absorber comprising a pair of telescoping cylinders, a duality of fluid chambers within said cylinders having fluid stored therein, a port and a passage enabling displacement of the fluid between said chambers during the telescopic movement of said cylinders, a valve normally closing said port, said valve being responsive to a predetermined pressure of the fluid within one of said chambers during the expansion stroke of said cylinders for opening said port and closing said passage, and a second valve responsive to said pressure for controlling the fluid conveying capacity of said port.

3. A hydraulic shock absorber comprising a pair of telescoping cylinders, a duality of liquid containing chambers with said cylinders, a pair of passageways affording intercommunication of said chambers, a valve responsive to a predetermined pressure of the liquid within one of said chambers during movement of said cylinders in one direction for closing one of said passageways and opening the other, and a second valve responsive to said pressure for controlling the liquid conveying capacity of said other passageway.

4. A hydraulic shock absorber comprising a pair of telescoping cylinders, a duality of liquid containing chambers within said cylinders one smaller than the other, a pair of passageways capable of affording intercommunication of said cylinders, a valve for each of said passageways, spring means operatively associated with each valve for normally maintaining one open and the other closed relative to their respective passageways, said valves being responsive to pressure conditions of the liquid within the smaller chamber during the expansion strokes of said cylinders one for closing its normally opened and the other for opening its normally closed passageway.

5. A shock absorber comprising a pair of telescoping cylinders, a liquid containing reservoir and a chamber within said cylinders, a normally opened and a normally closed passage leading from said reservoir into said chamber the former enabling free flow of the liquid therethrough during the reciprocatory movement of said cylinders at a rate of speed below a predetermined maximum, a pair of valves operatively associable with said passages subjected to an increase of the liquid pressure within said chamber resulting from the expansion strokes of said cylinders at a rate of speed above said maximum for closing said normally opened passage and for opening said normally closed passage, and adjustable means for varying the liquid-pressure necessary for opening said last passage.

6. A shock absorber comprising a pair of telescoping cylinders, a reservoir within and an annular chamber between said cylinders having liquid stored therein, a piston fixed to the inner end of the inner cylinder forming one end of said chamber, passages between said reservoir and chamber enabling displacement of the liquid therebetween during the telescoping movement of said cylinders, a valve for controlling at least one of said passages, a compression spring urging said valve in closed position relative to said passage, and means actuated by virtue of relative rotation of said cylinders when at the end of their stroke in one direction for varying the compression of said spring.

7. A shock absorber comprising a pair of telescoping cylinders, a reservoir within and an annular chamber between said cylinders having liquid stored therein, a piston fixed to the inner end of the inner cylinder in slidable engagement with the inner wall of the outer cylinder, interconnecting means between said reservoir and chamber, valve means enabling during the reciprocatory movement of said cylinders at a predetermined rate of speed a freer flow of the liquid from said reservoir into said chamber than from said chamber into said reservoir, and means responsive to relative rotation of said cylinders for varying the degree of freedom of the liquid-flow from said chamber into said reservoir.

8. A shock absorber comprising a pair of telescoping cylinders capable of relative rotation, a piston fixed on the inner end of the inner cylinder in slidable engagement with the outer cylinder, chambers in said cylinders having liquid stored therein capable of displacement therebetween in two directions upon telescopic movement of said cylinders, means including a valve controlling said displacement in one direction, a seat for said valve, a spring active on said valve urging it into engagement with said seat, and means responsive to said relative rotation for varying the force of said spring on said valve.

ELMER W. KRUEGER.